(12) United States Patent
Guyomarc'h (10) Patent No.: US 11,292,974 B2
(45) Date of Patent: Apr. 5, 2022

(54) DEVICE AND FACILITY FOR CONVERTING DRY CARBON-CONTAINING AND/OR HYDROCARBON-CONTAINING RAW MATERIALS INTO SYNTHESIS GAS

(71) Applicant: SEE—Soluções, Energia e Meio Ambiente Ltda., Sao Paulo (BR)

(72) Inventor: Raymond Guyomarc'h, Negrepelisse (FR)

(73) Assignee: SEE—Soluções, Energia e Meio Ambiente Ltda., Sao Paulo (BR)

( * ) Notice: Subject to any disclaimer, the term of this patent is extended or adjusted under 35 U.S.C. 154(b) by 154 days.

(21) Appl. No.: 16/618,572

(22) PCT Filed: May 16, 2018

(86) PCT No.: PCT/EP2018/062709

§ 371 (c)(1),
(2) Date: Dec. 2, 2019

(87) PCT Pub. No.: WO2018/219648

PCT Pub. Date: Dec. 6, 2018

(65) Prior Publication Data

US 2020/0157441 A1    May 21, 2020

(30) Foreign Application Priority Data

May 31, 2017 (FR) .................................... 1754816

(51) Int. Cl.
*C10J 3/20*   (2006.01)
*C10B 49/02*  (2006.01)

(52) U.S. Cl.
CPC ................ *C10J 3/20* (2013.01); *C10B 49/02* (2013.01); *C10J 2300/1207* (2013.01); *C10J 2300/1246* (2013.01)

(58) Field of Classification Search
CPC . C10J 3/66; C10J 3/22; C10J 2200/152; C10J 2300/1207; C10J 3/20; C10J 3/48; C10J 3/485
See application file for complete search history.

(56) References Cited

U.S. PATENT DOCUMENTS 3,761,568 A * 9/1973 Brink ......................... C10J 3/30
                                                        423/207
5,226,927 A * 7/1993 Rundstrom ................ C10J 3/26
                                                        48/111

(Continued)

FOREIGN PATENT DOCUMENTS

DE     102005000768 A1    7/2006

OTHER PUBLICATIONS

International Search Report for corresponding Application No. PCT/EP2018/062709 dated Aug. 24, 2018.

*Primary Examiner* — Imran Akram
(74) *Attorney, Agent, or Firm* — Renner, Otto, Boisselle & Sklar, LLP (57) ABSTRACT

The invention relates to a device (100) for converting carbonaceous dry raw materials (MPCS) into a synthesis gas, comprising a MPCS pyrolysis chamber (110); a port (106) for introducing the MPCS into said pyrolysis chamber (110); and a port (108) for extraction of synthesis gas from said pyrolysis chamber (110). The device (100) further includes a central chamber (120) immersed in said pyrolysis chamber (110) and comprising a port (128) allowing only a gaseous communication between said central chamber (120) and said pyrolysis chamber (110); and an oxygen injection port (132) in said central chamber (120) for oxidizing at least one portion of the pyrolysis gases passing from the pyrolysis chamber (110) to the central chamber (120).

7 Claims, 3 Drawing Sheets

(56) References Cited

U.S. PATENT DOCUMENTS

| | | | | |
|---|---|---|---|---|
| 6,084,139 A | * | 7/2000 | Van Der Giessen | C10B 53/02 585/240 |
| 2006/0265954 A1 | * | 11/2006 | Dogru | C10J 3/30 48/197 R |
| 2012/0311930 A1 | * | 12/2012 | Dogru | C10J 3/30 48/61 |
| 2013/0097928 A1 | * | 4/2013 | Schwarz | C10J 3/26 48/87 |
| 2013/0129569 A1 | * | 5/2013 | Schiefer | B01J 8/008 422/109 |
| 2013/0185999 A1 | * | 7/2013 | Chen | F23G 5/027 48/111 |
| 2014/0196369 A1 | * | 7/2014 | Wiklof | C10J 3/723 48/101 |
| 2014/0338262 A1 | * | 11/2014 | Schwarz | C10J 3/26 48/89 |
| 2016/0362623 A1 | | 12/2016 | Mason | |
| 2018/0086994 A1 | * | 3/2018 | Kresnyak | C10B 57/16 |

\* cited by examiner

DEVICE AND FACILITY FOR CONVERTING DRY CARBON-CONTAINING AND/OR HYDROCARBON-CONTAINING RAW MATERIALS INTO SYNTHESIS GAS

The present application is a U.S. National Stage Application based on and claiming benefit and priority under 35 U.S.C. § 371 of International Application No. PCT/EP2018/062709, filed 16 May 2018, which in turn claims benefit of and priority to French Application No. 1754816, filed 31 May 2017, the entirety of each of which is hereby incorporated herein by reference.

The present invention relates to a device for conversion of carbonaceous and/or hydrocarbon dry raw materials into synthesis gas. It also relates to an installation comprising such a device.

The field of the invention is the field of generating a flow of synthesis gas from carbonaceous and/or hydrocarbon dry raw materials.

RELATED ART

Taking into account that most of the virgin or manufactured carbonaceous materials, new or used, contain elements of hydrogen in their chemical composition, for the sake of simplicity they will be called "MPCS" ("Matières Premières Carbonées et/ou hydrocarbonées Sèches"), "Carbonaceous and/or hydrocarbon dry raw materials".

There are currently different systems for converting MPCS into a synthesis gas, especially designed by the same inventor. These systems include a treatment volume in which the MPCS are heated to initiate pyrolysis of said MPCS.

In order to make MPCS reach pyrolysis temperature, current systems use a heat carrier gas flow, usually composed of $CO_2$, supplied through an external device. The heat carrier gas flow is heated before being injected into the treatment volume where the MPCS are located. It is very advantageous to use $CO_2$ in a heat carrier flow because it contains carbon and oxygen atoms, which react with carbon and/or hydrocarbon molecules from MPCS to increase the amount of CO and $H_2$ in the synthesis gas.

However, the use of a heat carrier gas flow requires generating such heat carrier gas flow. A first solution consists of use an external facility providing such gas flow, which is not always the case. This limits the use of current systems on sites that do not have such a facility. Another solution is to generate the heat carrier gas flow by oxy-combustion of a portion of the synthesis gas obtained, which reduces the overall yield of amount of synthesis gas obtained. In addition, whatever the solution, it is necessary to heat the heat carrier gas flow prior to its introduction into the treatment volume.

It is, above all, essential to promote a close contact between the MPCS and the heat carrier agent to obtain an optimal pyrolysis; therefore the configuration of the treatment system must allow the perfect integration of the heat carrier agent with the MPCS, without omitting any space that could impair treatment efficiency. To succeed this challenge, in a context where thermal conditions are paramount and interact on the thermodynamic currents inside the systems, the means used are often plethoric. For example, external mechanical systems for injection of high temperature heat carrier agents under pressure, which require special equipment, increasing the complexity of the current systems, and therefore their costs.

An object of the present invention is to overcome these disadvantages.

Another object of the invention is to propose an autonomous device for converting MPCS into synthesis gas which can be used even on sites which do not have an external facility to provide a heat carrier gas flow, while having a better performance.

Yet another object of the invention is to provide a less complex and less expensive device for converting MPCS into synthesis gas.

PRESENTATION OF THE INVENTION

The invention allows to achieve at least one of these objects by means of a device for converting carbonaceous and/or hydrocarbon dry raw materials (MPCS) into a synthesis gas comprising, in particular consisting of, CO and $H_2$.

The device according to the invention comprises:
- a MPCS pyrolysis chamber open at the top and bottom, and adapted to contain MPCS;
- a port (opening), at the top, for introducing the MPCS into said pyrolysis chamber; and
- a port, at the bottom, for extraction of synthesis gas from said pyrolysis chamber;

wherein said device further comprises a central chamber disposed in said pyrolysis chamber and comprising:
- at least one port allowing only a gas communication between said central chamber and said pyrolysis chamber, and in particular from the central chamber to the pyrolysis chamber; and
- at least one oxygen injection port in said central chamber to oxidize at least a portion of the pyrolysis gas passing from the pyrolysis chamber to the central chamber.

The oxy-combustion of a portion of the pyrolysis gases in the central chamber makes possible to provide the thermal energy necessary to heat the MPCS and to cause their pyrolysis, and to provide them with a temperature of about 1,200° C. at the bottom of the pyrolysis chamber. The thermal energy for the pyrolysis of the MPCS is thus generated in the device according to the invention, and in particular inside the central chamber, which is itself in the centre of the pyrolysis chamber. In other words, the central chamber constitutes the thermal generator of the device according to the invention. Therefore, the device according to the invention does not require the use of a heat carrier gas flow previously heated supplied by an external facility to operate over time. The device according to the invention is therefore autonomous so that it can be installed and used on any site.

The device according to the invention does not require, either, to use a portion of the synthesis gas to generate a heat carrier gas flow, with said synthesis gas, recycled and conditioned by a natural autogenous thermodynamic effect inside of the central column itself, interacting as a heat carrier agent, without mechanical assistance of any kind. Thus, the device according to the invention has a better performance compared to systems of the related art.

In addition, the MPCS are introduced into the pyrolysis chamber through the introduction port located at the top, and the MPCS move from top to bottom in the pyrolysis chamber, under the effect of gravity, as they are treated. The pyrolysis gases move in the pyrolysis chamber also from top to bottom (downward flow) because they are extracted by the extraction port located at the bottom. However, the oxy-combustion of a fraction of the pyrolysis gases in the central chamber increases the temperature, as well as the pressure, in the central column, which imposes an upward flow, opposite to the downward flow of the pyrolysis chamber. The upward gas is then forced to circulate to the pyrolysis chamber and enter the MPCS in said pyrolysis chamber.

This forced circulation of hot gas from the central chamber, and its injection into the centre of the MPCS in the pyrolysis chamber, allows a close transmission of its thermal capacity to said MPCS, and the pyrolysis of said MPCS is accomplished in an accelerated manner, indeed instantly.

In the present application, "carbonaceous and/or hydrocarbon dry raw materials" or "MPCS" denotes carbonaceous and/or hydrocarbon raw materials whose degree of relative humidity (relative to total mass) is less than 8%, and preferably anhydrous.

According to an exemplary embodiment, the MPCS can include:
  plant or animal biomass;
  water treatment sludge;
  methanation residues;
  coal;
  peat;
  lignite;
    organic waste, or waste having non-carbonaceous and/or non-hydrocarbon chemical composition;
  used tires; or
  any combination of the above carbonaceous materials.

In the present application, "synthesis gas" refers to a gas composed essentially or exclusively of CO and $H_2$. Depending on whether the carbonaceous raw material has in its composition the hydrogen element, and/or said material has a relative humidity, the "synthesis gas" ("syngas") will be composed of a proportion of $H_2$ more or less important.

In particular, the central chamber may be disposed in the pyrolysis chamber, so that it is entirely surrounded by the pyrolysis chamber, and in use said central chamber is immerse in the MPCS in said pyrolysis chamber.

Of course, the device according to the invention requires a thermal input for its starting.

To accomplish it, it may include a thermal source, such as for example a flame burner, disposed in the central chamber, in particular at its bottom.

At starting, the thermal source initiates a natural upward flow in the free space of the central chamber and generates an overpressure, which is defined by the configuration of said central chamber and its immersed situation in the carbonaceous raw materials. When the overpressure in said central chamber is greater than the forces and inertias of said MPCS, the heat generated by the thermal source is ejected to the pyrolysis chamber where it is transmitted to the MPCS. The first pyrolysis gases, which are then formed on the periphery of the central chamber, gravitate along the outer wall of the chamber, from top to bottom, by the simple thermodynamic effect created by the upward flow of said heat source within of said central chamber. This thermodynamic effect generates a vacuum at the bottom of said central chamber that aspirates said first pyrolysis gases. Interacting with the starting thermal source, said first pyrolysis gases are heated to high temperature, they expand and the internal overpressure of said central chamber increases, accelerating the circulatory movement from bottom to top in said central column and from top to bottom outside thereof in said pyrolysis chamber. A natural thermosiphon effect is generated which will stop only with the stopping of the pyrolysis device.

Such a thermal source can be used only to provide the thermal energy necessary to start the operation of the device according to the invention. As soon as the first pyrolysis gases are formed and pass into the central column, the use of this thermal source is stopped.

Of course, the natural thermosiphon effect above described and started by the thermal source is maintained thanks to the oxy-combustion of a portion of the pyrolysis gases, even after the thermal source has been stopped.

According to a particular embodiment, the central chamber may comprise on its bottom a so-called cracking chamber, comprising at least one oxygen injection port.

Thus, the oxy-combustion of pyrolysis gas is carried out at the bottom of the central column in the cracking chamber.

This cracking chamber is in communication with the pyrolysis chamber through its bottom and in communication with the remaining of the central chamber through its top.

In addition, the cracking chamber may preferentially be sealed on the sides.

According to a non-limiting embodiment, the central chamber and the pyrolysis chamber may be concentric.

In addition, the central chamber may be disposed equidistant from the side walls of the pyrolysis chamber.

In addition, the central chamber may be disposed at a height between ⅓ and ⅔ of the height of the pyrolysis chamber, and more particularly at mid-height in the pyrolysis chamber.

Advantageously, the central chamber can be closed at the top and on the sides, and open to the pyrolysis chamber at its bottom.

In particular, the top of the central chamber can be shaped like a cone or a pyramid, so as to direct the MPCS poured into the device in the pyrolysis chamber located around the central chamber.

The pyrolysis gases from the pyrolysis chamber, which will be oxidized in the central chamber and in particular in the cracking chamber, enter said central chamber through the bottom thereof, which is open to the pyrolysis chamber.

The central chamber may comprise ports allowing gas communication only between said central chamber and the pyrolysis chamber, at the top of said central chamber and on the sides of same chamber.

Thus, the thermal energy generated by the oxy-combustion of a fraction of pyrolysis gas in the central chamber can pass from the central chamber to the pyrolysis chamber through the side walls and the upper wall of the central chamber, and penetrate the MPCS in said pyrolysis chamber through almost the entire pyrolysis chamber.

The circulation from the central chamber to the pyrolysis chamber, due the natural thermosiphon effect which was initiated in the starting of the pyrolysis, is accelerated by the controlled admission of oxygen into the said cracking chamber. These controlled thermodynamic effects determine the kinetics of said natural thermosiphon effect and the speed of the pyrolysis process.

In other words, a fraction of pyrolysis gas enters the central chamber at the bottom of said central chamber open to the pyrolysis chamber, and a relative portion of this fraction of pyrolysis gas, according to the control of heat/pressure controlled by set temperature, is oxidized by injecting oxygen into the cracking chamber. The temperature generated by the oxy-combustion creates an upward movement in the central chamber which forces the gas flow obtained after oxy-combustion to exit the central chamber through its side and upper walls, and to penetrate the MPCS in the pyrolysis chamber.

This thermodynamic movement of contrary vertical circular flows (upward/downward) along the entire periphery of the central column (composed of the central chamber and the cracking chamber) is known as "natural thermosiphon effect".

However, the implementation of such a movement without mechanical assistance, even within a zone filled with fragmented solid matter (which form a static mass as long as the said materials are not gasified), can not exist otherwise than by a system in perfect symbiosis and synergy with its environment.

The arrangement of the central chamber in the centre of the pyrolysis chamber and the configuration of said central chamber allow, alone, the existence of such a movement:
- a hollow space in said central chamber delimited by the vertical and upper walls in the centre of a zone filled with fragmented solid matter, wherein all combustion automatically generates an upward flow;
- a hollow space in said central chamber delimited by the vertical and upper walls in the centre of a zone filled with fragmented solid matter, wherein all combustion automatically generates a volume expansion of combustion gases;
- the volume expansion of combustion gases contained in said space delimited by its vertical and upper walls automatically generates an expansion of the internal pressure in said space;
- the vertical and upper walls that delimit said hollow space are pierced with outlet holes for the pressurized gas at high temperature;
- the outlet holes allow the evacuation of said high temperature gas to said pyrolysis chamber, which accelerates the upward flow in said central chamber and generates a vacuum on the bottom of said central chamber in the interconnection with said pyrolysis chamber;
- the upward flow is in opposition to the gravitational downward flow of said fragmented solid matter in the same space as said central chamber;
- the pressurized gas at high temperature interpenetrates said fragmented solid matter imparting to it its heat capacity.

This interaction is violent and subjects said fragmented solid matter to a significant thermal shock. Said MPCS are at room temperature (less than 15° C. to above 30° C.) and the gases are at 1,200° C.

The heat exchange instantaneously generates the pyrolysis of the MPCS at the same time as the temperature above 1,200° C. of said gases initiates the reaction of oxy-reduction (oxidation-reduction) between the carbons of said MPCS and the molecules of $CO_2$ and $H_2O$, which originate from oxidation of the molecules of CO and $H_2$ of said pyrolysis gases as well as the complementary $CO_2$ which are injected into said pyrolysis chamber.

The pyrolysis of said MPCS reduces the volume of carbonaceous/hydrocarbon gasifiable solids by more than 90% around said central chamber in said pyrolysis chamber. This reduction of volume is immediately filled by a supply of MPCS in a gravitational downward flow.

Therefore, said gases ejected from said central chamber in said pyrolysis chamber, and said pyrolysis gases generated during this interaction, are instantaneously subjected to said gravitational downward flow of said MPCS. The downward flow of this gaseous assembly is favored by the mechanical aspiration extraction of the synthesis gas at the bottom of the conversion device.

Passing through the non-gasified MPCS reduced to the state of pure carbons (char or biochar), which are accumulated by gravity on an ash evacuation grid at the bottom of said pyrolysis chamber, said pyrolysis gases (generated during the interaction described above) finalize the gasification of said pure carbons by reaction of oxy-reduction with residual $CO_2$ in said pyrolysis gas.

The natural aspiration generated at the base of said pyrolysis chamber by oxidation of synthesis gas in said central chamber, more particularly in the cracking chamber located at the bottom of said central chamber, takes advantage of this downward gaseous flow.

A fraction of said pyrolysis gas (equivalent to the volume of gas evacuated by said outlet holes) is naturally aspirated into said cracking chamber where it is partially oxidized by the supply of $O_2$ from an oxygen injection.

This oxidized fraction feeds the upward gas flow in said central chamber and regenerates the autothermal thermodynamic cycle in said pyrolysis chamber.

Thus generated, these vertical and opposite gas flows (upward/downward) along the entire periphery of the central chamber, in a zone totally influenced by the natural gravitational flow of the MPCS and the mechanical aspiration extraction of the synthesis gas at the central chamber outlet located at the bottom of the converter, create an autogenous thermodynamic facility thanks to which all the particles of MPCS are subjected to the high temperature heat carrier gases and reagents which gasifies them.

Optionally, the device according to the invention may comprise at least one port for introduction of a gaseous flow of $CO_2$, in particular heated, in the pyrolysis chamber, and in particular above the central chamber.

Such an injection of $CO_2$ makes possible to adjust the proportion of oxygen and carbon elements in the synthesis gas produced by the device according to the invention.

Advantageously, the device according to the invention may comprise at least a double wall separating the central chamber from the pyrolysis chamber, in particular on the sides of the central chamber, designed to circulate a gaseous flow of $CO_2$ therein.

This gaseous flow of $CO_2$ may be partially or wholly injected into the pyrolysis chamber, as described above.

Advantageously, on the opposite side to the central chamber, the pyrolysis chamber is delimited, or even surrounded, by a double wall on at least one lateral portion of said pyrolysis chamber, wherein said double wall is designed in particular to circulate a gaseous flow of $CO_2$ therein, which can then be injected into the pyrolysis chamber, as described above.

Such a double wall makes possible to reduce the heat losses toward the environment of the device according to the invention, by favoring the heat exchange toward the pyrolysis chamber.

Preferably, the double wall separating the pyrolysis and central chambers and the double wall delimiting the pyrolysis chamber may communicate with each other through one or more transverse double walls.

In this case, these transverse double walls pass through the pyrolysis chamber.

The device according to the invention may comprise a port for introduction of $CO_2$ in at least one double wall.

Preferably, the device according to the invention may be in the form of a one-piece assembly.

The one-piece assembly, and/or the pyrolysis chamber, and/or the central chamber, may be cylindrical.

In addition, the pyrolysis chamber and the central chamber may preferentially be vertical.

According to another aspect of the present invention, there is provided a facility for production of a synthesis gas comprising, and in particular consisting of, CO and $H_2$, from carbonaceous and/or hydrocarbon dry raw materials (MPCS), said installation comprising:

a conversion device according to the invention;
means for introduction of MPCS in said conversion device; and
means for extraction of synthesis gas, provided by said conversion device.

The extraction means may comprise at least one of the following means:

at least one means for aspiration of synthesis gas attached or connected to the extraction port of the conversion device;
at least one heat exchanger for cooling the synthesis gas supplied from said converting means;
at least a filtering device of synthesis gas provided by said conversion device.

The means for introduction of MPCS into the conversion device may use a worm screw or any other MPCS routing device.

DESCRIPTION OF DRAWINGS AND EMBODIMENTS

Other advantages and features will appear by examining the detailed description of a non-limiting embodiment and accompanying drawings, in which.

It should be understood that the embodiments described below are not limiting in any way. In particular, it will be possible to imagine variants of the invention comprising only a selection of characteristics described subsequently isolated from other characteristics described, if this selection of characteristics is sufficient to confer a technical advantage or to differentiate the invention from the prior art. This selection comprises at least one feature preferably functional without structural details, or having only a portion of the structural details if this portion alone is sufficient to confer a technical advantage or to differentiate the invention from the state of the prior art.

In the drawings, the elements common to several figures retain the same reference.

Figure 1:
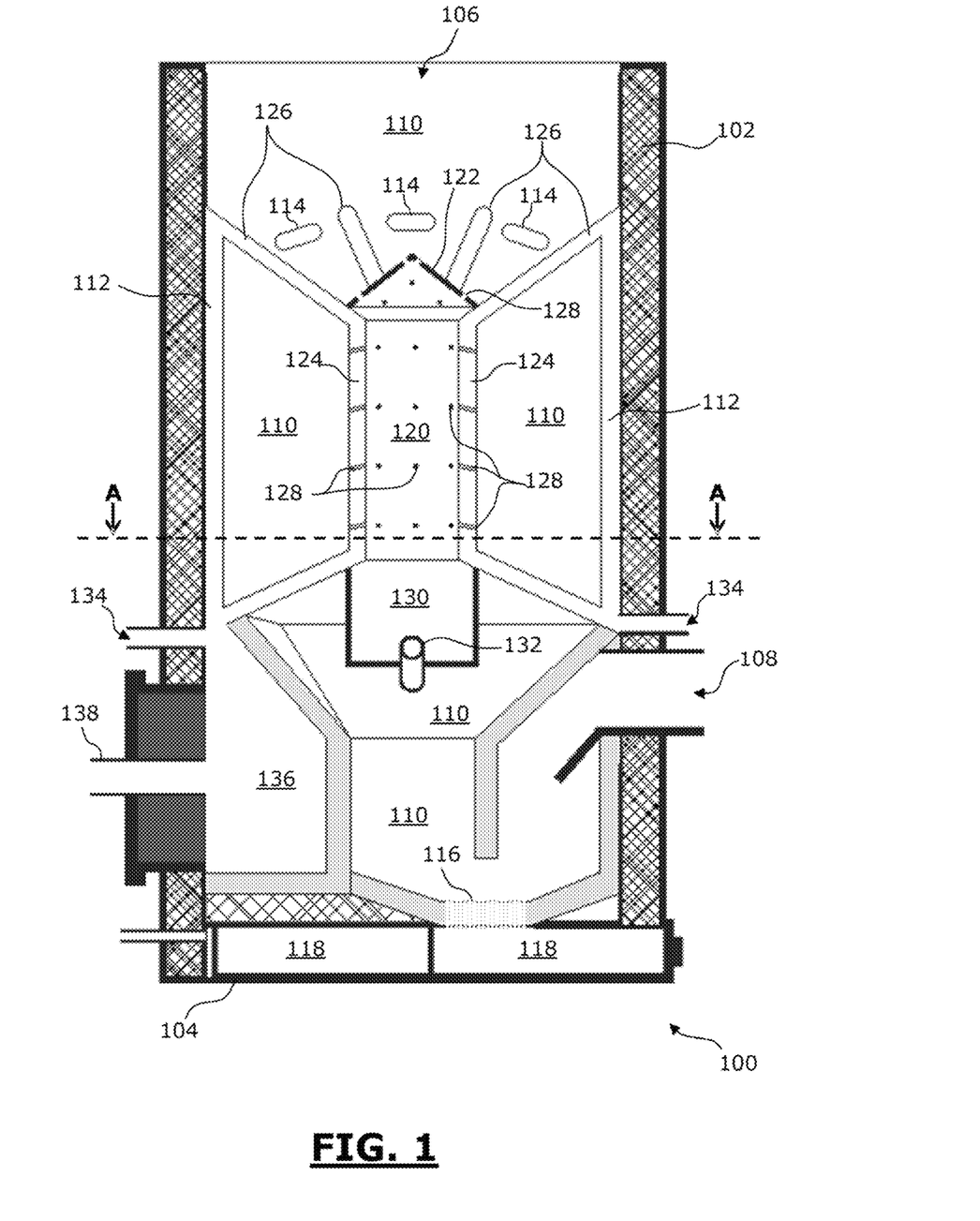
FIG. 1 is a schematic vertical section view of a non-limiting exemplary embodiment of a conversion device according to the invention.
Figure 2:
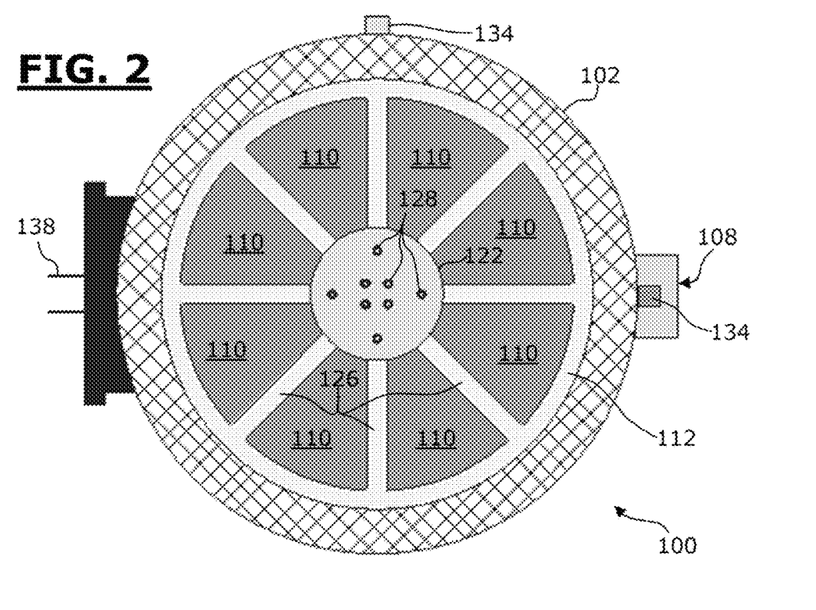
FIG. 2 is a schematic top view of the device in FIG. 1.
Figure 3:
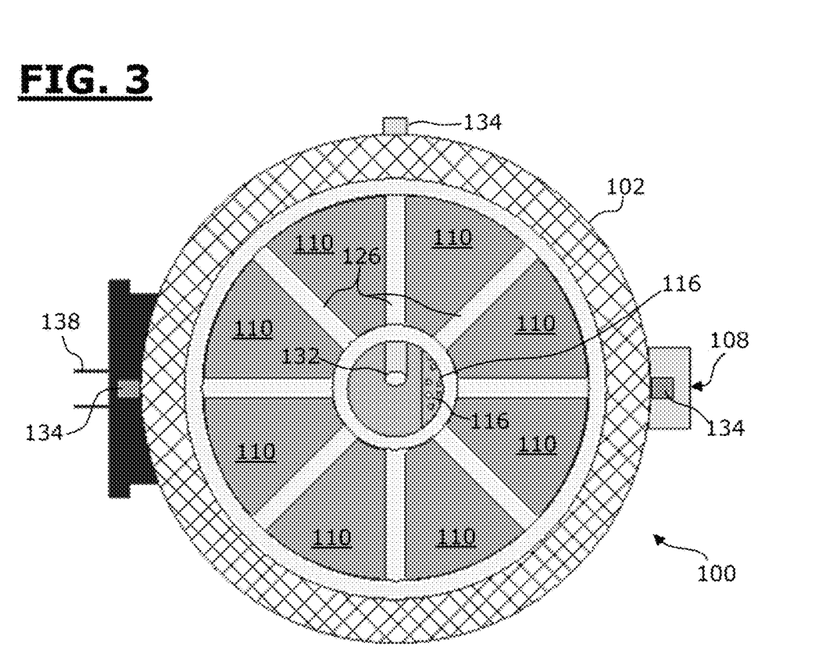
FIG. 3 is a schematic horizontal section view of the device in FIG. 1.

FIGS. 1-3 are schematic views of a non-limiting exemplary embodiment of a device according to the invention for conversion of MPCS into synthesis gas.

FIG. 1 is a vertical section view of the device, FIG. 2 is a top view and FIG. 3 is a horizontal sectional view along line A-A in FIG. 1.

The conversion device 100 shown in FIGS. 1-3 is in the form of a vertical cylindrical one-piece assembly formed of a side wall 102 and a bottom wall 104.

The device 100 comprises a port 106 for introduction of MPCS at its upper end and a port 108 for extracting synthesis gas at its bottom.

The device 100 further comprises a MPCS pyrolysis chamber 110 extending substantially along the entire height of the conversion device 100.

The pyrolysis chamber 110 is open at the top along the entire width of the introduction port 106, for pouring the MPCS to be treated.

In the pyrolysis chamber 110 the MPCS move downward due to gravity.

The synthesis gases generated in the pyrolysis chamber 110 also move downward because they are evacuated, for example by aspiration, through the extraction port 108 located at the bottom of the device 100.

In the central portion of the device 100, along the vertical axis, the pyrolysis chamber 110 is separated from the outer side wall 102 of the device 100 by a double wall 112. This double wall is designed to circulate a gaseous flow of $CO_2$ to heat it.

In addition, the pyrolysis chamber 110 comprises, at the top, hot $CO_2$ injection grills 114 formed in the double wall 112, so that the gaseous flow of heated $CO_2$ is introduced in the top of the pyrolysis chamber.

In its lower section, the width of the pyrolysis chamber 110 decreases so that the bottom of said pyrolysis chamber 110 forms a funnel. This funnel is open on the side of the extraction port 108, and the latter is located above the bottom level of the funnel. Thus, the non-gasifiable solid residues released during the pyrolysis of MPCS can not exit through the synthesis gas extraction port 108.

Under the funnel, that is, under the pyrolysis chamber 110, a grill 116 and an ashtray 118 are provided for evacuation of non-gasifiable solid residues.

The device 100 further comprises a central chamber 120 shaped like a vertical column. The central chamber 120 is disposed in the pyrolysis chamber 110 and is completely surrounded by the pyrolysis chamber above, below and on the sides. In other words, the central chamber 120 is completely embedded or immersed in the pyrolysis chamber 110.

The central chamber 120 is separated from the pyrolysis chamber 110.

At the top the central chamber 120 has a single wall 122 forming a cap shaped like a cone or a pyramid, so as to direct the MPCS in the pyrolysis chamber located around the central chamber 120.

On the sides, the central chamber 120 is separated from the pyrolysis chamber by a double wall 124, provided for circulating a gaseous flow of $CO_2$ in order to heat it. This double wall 124 is in communication with the double wall 112 through tubular transverse connections 126 that connect them together. The circulation occurs from the top of the double wall 124 of the central chamber 120 to the top of the double wall 112 of the pyrolysis chamber 110, and from the base of the double wall 112 of the pyrolysis chamber 110 to the base of the double wall 124 of the central chamber 120. This configuration allows the natural circulation of $CO_2$ in this assembly due the "thermosiphon effect" generated and controlled by the high heat (temperature rise to above 1,200° C. in the conditions explained hereinafter) generated in the cracking chamber and the heat exchange, through conduction and radiation, by the inner wall of the double wall 124 of the central chamber 120, generating an upward flow of $CO_2$ contained in this double wall and which expands on heating. Said $CO_2$ circulating in said double walls 124 and 112 cools by heat exchange with the MPCS, through conduction and radiation, and it densifies by imposing a downward flow in the double wall 112 of the pyrolysis chamber 110. These inverted flows cause a natural thermodynamics circulation of said $CO_2$ through "thermosiphon effect" generated and controlled by oxy-combustion of a fraction of the pyrolysis gas generated in the cracking chamber.

The walls 122 and 124 comprise gaseous communication ports 128 allowing only passage of gas between the central chamber 120 and the pyrolysis chamber 110. Thus, the high temperature gas (above 1,200° C.) produced in the central chamber 120 can pass into the pyrolysis chamber 110 for example through the double side wall 124 or the cap 122.

The central chamber 120 comprises on the bottom a chamber 130, so-called cracking chamber, which forms the lower section of the central chamber 120. At the top said chamber 130 is open to the remaining of the central chamber 120, and at the bottom it is open to the pyrolysis chamber 110. The side wall of the cracking chamber is sealed.

Said cracking chamber 130 has at its lower end an oxygen injector 132 for oxidize a portion of the pyrolysis gases contained therein, which originate from the pyrolysis chamber 110 in the periphery of the base of the cracking chamber 130, as explained below.

The oxy-combustion of the pyrolysis gases in the cracking chamber 130 is very exothermic. On the one hand, this exothermic process generates thermal energy that supplies the energy requirement of the device 100 for the conversion of the MPCS into synthesis gas. On the other hand, the exothermic oxy-combustion in the cracking chamber 130 generates a strong expansion of the gas, which is heated to above 1,200° C. and is contained by the walls of the cracking chambers 130 and the central chamber 120. Such expansion creates an exponential overpressure in the central chamber 120, the excess of which is evacuated by powerful jets of hot gases through the outlet ports 128. This overpressure and these evacuation jets generate an upward flow of the gas flows in the pyrolysis chamber 120, opposite to the downward flow of the pyrolysis chamber 130. The upward flow combined with the overpressure allows the gaseous flow at a temperature above 1,200° C. to penetrate all the MPCS present in the pyrolysis chamber 110 through the walls 124 and 122. These outlets favor and accelerate the upward thermodynamic flow, which creates a relative vacuum at the periphery of the base of the cracking chamber 130, in the interconnection with the pyrolysis chamber 110. This generates an aspiration in this passage zone of the pyrolysis gases (CO and $H_2$), which are in downward movement aspired by the extraction system described below. The equivalent relative to the gases expelled by the outlet ports 128 is aspired into said cracking chamber 130, where a fraction of these pyrolysis gases is oxidized by the oxygen introduced through the injector 132. Said oxygen injection is drastically controlled by the control of temperature inside the central chamber 120 (through a probe already known, not described), wherein oxidation of a fraction of the pyrolysis gases aspired into the cracking chamber 130 raise the temperature of all of said pyrolysis gases (aspired at the interconnection of the periphery of the base of the cracking chamber 130 with the pyrolysis chamber 110) to above 1,200° C., which contributes to the upward thermodynamic flow and the overpressure and expulsion of hot gases to the pyrolysis chamber 110. Such thermodynamic movement with opposing vertical circular flows (upward/downward) along the entire periphery of the central column (composed of the central chamber 120 and the cracking chamber 130) is known as "natural thermosiphon effect". The gaseous assembly above 1,200° C., which is propelled into the centre of the MPCS in the entire volume of the pyrolysis chamber 110, is essentially composed of CO and $H_2$ of said pyrolysis gases (aspired into the interconnection of the periphery of the base of the cracking chamber 130 with the pyrolysis chamber 110) and molecules of $CO_2$ and $H_2O$ from the oxy-combustion of the fraction of said pyrolysis gases (aspired into the cracking chamber 130), whose exothermic oxidation by oxygen from the injector 132 allows said gaseous assembly to reach above 1,200° C., depending on the desired pyrolysis kinetics. The thermodynamic cycle with thermosiphon effect, autogenous and permanent, continuously recycles a portion of pyrolysis gas which becomes the main heat carrier agent that provides the thermal energy necessary for the pyrolysis of all the MPCS present in the pyrolysis chamber 110, before being extracted as synthesis gas via the port 108. The overpressure (controlled by the temperature of the middle of the central chamber 110) is defined higher than the inertia of the MPCS present in the funnel of the pyrolysis chamber 110 (under the cracking chamber 130), which has an effect of allowing partial evacuation of superheated pyrolysis gases from said cracking chamber. This fraction of the pyrolysis gases is superheated above 1,200° C. and directly interacts with the pyrolysis gases that are aspired (in downward dynamic flow through the system of extraction of synthesis gas), to react with the residual carbons of the MPCS (above 1,000° C. and which have not been pyrolyzed at this stage in the pyrolysis chamber 110) and provide the compensatory energy for the oxy-reduction reaction that occurs between these "reducing" carbons and the "oxidizing" molecules of $CO_2$ and $H_2O$ carried by the pyrolysis gas.

"Endothermic" thermochemical reaction which gasifies said residual carbons of the MPCS and reconverts said $CO_2$ and $H_2O$ into energy resource of CO and $H_2$, according to the formulas described by Boudouard:

$$C+CO_2 \rightarrow 2CO \text{ and } C+H_2O \rightarrow CO+H_2$$

The pyrolysis is thus complete without consumption of pyrolysis gas, which would reduce the efficiency of the transfer of the potential energy of the MPCS to the synthesis gas ("syngas"). In contrast, the oxy-reduction reaction that occurs between "reducing" carbons and "oxidizing" molecules of $CO_2$ provides the "syngas" with molecules of CO (energy resource from reduction of $CO_2$) that compensates for the endothermia of the final reaction.

The inner face of the double wall 124 of the central chamber 120 is heated to the temperature of the upward gaseous flow (above 1,200° C.). This inner wall of the double wall 124 of the central chamber 120 is in contact with the $CO_2$, which circulates in said double wall 124 to which it transmits the heat of the central chamber 120. The $CO_2$ circulating in said double wall 124 is also heated by the outlet tubes (ports) 128 that pass through said double wall 124. The outer wall of the double wall 124 of the central chamber 120 is heated by the $CO_2$ which circulates in said double wall 124 and transmits the heat carried by said $CO_2$ circulating in the MPCS contained in the pyrolysis chamber 110. This same $CO_2$ circulates at a temperature close to 1,200° C. in the upper tubular connections 126 and transmits its thermal capacity to the MPCS that supply the pyrolysis chamber 110. The same $CO_2$ circulates downward, with a decreasing temperature up to 1,000° C. in the double wall 112 of the pyrolysis chamber 110 with which it exchanges its thermal capacity to the MPCS contained therein. This same $CO_2$ returns, in a thermosiphon effect circular cycle, in the double wall 124 of the central chamber 120 (through the lower tubular connections 126) where it is reheated by the gaseous flow in said central chamber 120, such gaseous flow circulating with its own circular thermodynamic cycle with thermosiphon effect, generated by partial oxidation of pyrolysis gas generated by said gaseous flow. These two convolutions in the vertical axis thus have the same source of autogenous energy and are interdependent, and their synergistic autothermies contribute to a homogeneous heat exchange with the MPCS in the pyrolysis chamber 110. The conjugated, synergistic and permanent effects of the vertical thermodynamic convolutions create all the symbiotic conditions essential for optimal pyrolysis: complete and close interpenetration of the MPCS by heat transfer gas above 1,200° C., thanks to the overpressure jets of superheated pyrolysis gas coming from the central chamber; instantaneous thermodynamic exchange between the heat transfer gas above 1,200° C. and the MPCS, by convection, conduction, radiation and by a dynamic osmotic effect generated by the conjugation of the interpenetration under pressure (autogenous natural thermodynamic effect) of the heat transfer agent composed of pyrolysis gas ($CO+H_2$) and molecules of $CO_2$ and $H_2O$ (originating from oxy-combustion of the fraction of said pyrolysis gases aspired into the cracking chamber 130), wherein these molecules (identical to those that compose the MPCS and from the same already pyrolyzed MPCS) superheated above 1,200° C. are in osmosis with said MPCS; thermodynamic exchange also by the walls of the pyrolysis chamber, due the combined action of static heat exchanges (conduction and radiation of the walls in contact with the MPCS of the double-wall assembly in which the $CO_2$ between 1,200 and 1,000° C. circulates) and the downward dynamic and thermodynamic flows in the pyrolysis chamber 110.

In addition, the injector 132 may be used as a flame burner to provide the thermal energy necessary to starting the pyrolysis in the device 100. Alternatively a flame burner independent of the injector 132 may be provided.

The device 100 further comprises holes 134 for connecting the assembly of double walls 112, 124 and their tubular connections 126 to an external circulation device ensuring the circulation of $CO_2$ in these double walls.

The device 100 further comprises a chamber 136 for producing a gas flow of $CO_2$ in communication with the assembly of double walls 112, 124 and their tubular connections 126. This chamber 136 may comprise a conduit 138 for introducing a portion of the synthesis gas, or any other gas, to generate the gaseous flow of $CO_2$ autonomously.

Figure 4:
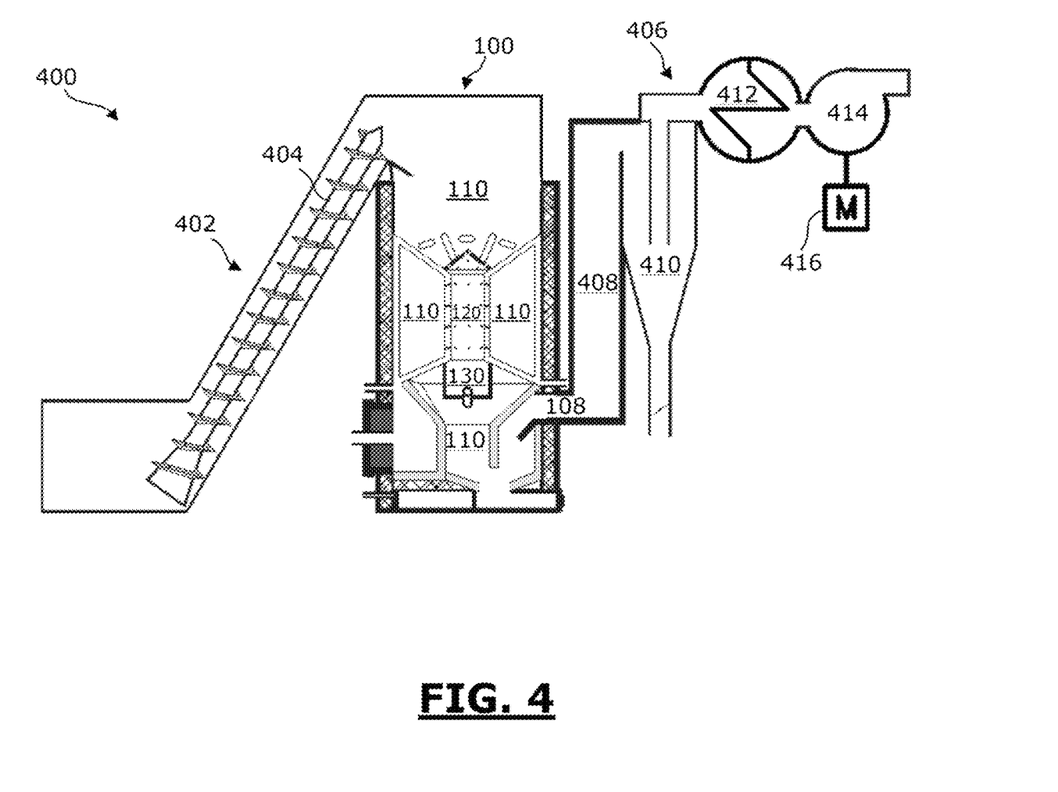
FIG. 4 is a schematic view of a non-limiting exemplary embodiment of a facility according to the invention.

FIG. 4 is a schematic view of a non-limiting exemplary embodiment of a facility according to the invention.

The facility 400 shown in FIG. 4 implements an MPCS conversion device, such as for example the device 100 of FIGS. 1-3.

The facility 400 furthermore comprises a supply device 402 that provides MPCS for the conversion device 100. The supply device 402 is connected to the introduction port 106 of the conversion device 100. It comprises, in a non-limiting way, a worm screw 404 (arranged in a sealed conduit) which conveys the MPCS until they are introduced into the pyrolysis chamber 110.

The installation 400 further comprises a device 404 connected to the extraction port 108 for extracting and treating the synthesis gas. The extraction and treatment device 406 comprises, in this order:
- a first heat exchanger 408 connected to the extraction port 108 to decrease the temperature of the synthesis gas;
- a cyclone 410 arranged downstream of the first heat exchanger 408 to remove any solid particles in the gas;
- a second heat exchanger 412 arranged downstream of the cyclone 410 to reduce the synthesis gas temperature to a temperature below 50° C.; and
- a mechanical extractor 414 comprising a motor 416 to aspirate the synthesis gas.

An example of a non-limiting operation of the conversion device 100 will now be described with reference to FIGS. 1-3. Although described with reference to the device 100, this operation can be applied to any device according to the invention.

The MPCS are introduced into the pyrolysis chamber 110 until said pyrolysis chamber 110 is filled with MPCS and the central chamber 120 is completely immersed in the MPCS. In this configuration, the MPCS occupy the entire pyrolysis chamber from the grill 116 to a level above the $CO_2$ injection grills 114.

During starting phase, thermal energy is supplied into the central chamber 120, for example, by means of a flame burner or by means of the oxygen injector 132. The supply of thermal energy is carried out until starting the pyrolysis in the pyrolysis chamber 110, that is, until the MPCS reach a temperature greater than or equal to 200° C. As soon the MPCS begin to decompose in pyrolysis gas, the supply of thermal energy is stopped, and the device can operate autonomously.

Under the action of the mechanical extractor 414, the pyrolysis gases are aspired in a downward movement in the pyrolysis chamber 110 through the port 108. A portion of the pyrolysis gases generated in the pyrolysis chamber 110 enters the cracking chamber 130 in the interconnection of the periphery of the base of the cracking chamber 130 with the pyrolysis chamber 110. These pyrolysis gases are at a temperature equal to or above 1,000° C.

The injection of oxygen into the cracking chamber 130 causes oxy-combustion of a fraction of the pyrolysis gases aspired into the cracking chamber 130. This oxy-combustion is eminently exothermic and generates a temperature above 1,200° C., which has several consequences. Firstly, the walls of the cracking chamber 130 as well as the walls 124 and 122 are heated and radiate thermally toward the pyrolysis chamber 110, maintaining the pyrolysis temperature throughout the pyrolysis chamber 110. Secondly, the increase in temperature creates an overpressure in the cracking chamber 130, which forces an upward gas movement into the central chamber 120. This upward movement and the generated overpressure force the gases in the central chamber 120 out of the central chamber 120 through the ports 128 and they penetrate the MPCS present in the pyrolysis chamber. The penetration of very hot gas above 1,200° C. allows:
- on the one hand, to heat all MPCS present in the pyrolysis chamber; and
- on the other hand, to bring the compounds $CO_2$ and $H_2O$ produced by oxy-combustion in contact with the MPCS; these compounds react with the MPCS as oxidants to produce CO and $H_2$, which allows to perfect the chemical reactions and to increase the efficiency of the pyrolysis of the MPCS.

If necessary, a gaseous flow of $CO_2$ at 1,200° C. is injected at the top into the pyrolysis chamber via grills 114.

As their pyrolysis progresses, the MPCS moves downward in the pyrolysis chamber. New MPCS are added at the top of the pyrolysis chamber 110.

The temperature of the MPCS gradually increases in the downward direction in the pyrolysis chamber thanks to the thermal energy provided by the central chamber 120, which constitutes the thermal generator of the device 100 according to the invention. At the bottom of the pyrolysis chamber 110, the MPCS and the synthesis gas obtained are at a temperature of less than or equal to 1,200° C.

The synthesis gas obtained is formed mainly, or even exclusively, by CO and $H_2$.

Of course, the invention is not limited to the examples detailed above.

The invention claimed is:

1. A device (100) for converting carbonaceous dry raw materials (MPCS) into a synthesis gas comprising CO and H2, said device (100) comprising:

a MPCS pyrolysis chamber (110) open at the top and bottom, and adapted to contain MPCS;

a port (106), at top of said pyrolysis chamber, for introducing the MPCS into said pyrolysis chamber (110); and a port (108) for extraction of synthesis gas from said pyrolysis chamber (110);

a central chamber (120) disposed in said pyrolysis chamber (110), and comprising:

at least one port (128) allowing only a gaseous communication between said central chamber (120) and said pyrolysis chamber (110); and at least one oxygen injection port (132) in said central chamber (120) for oxidizing at least one portion of the pyrolysis gases passing from the pyrolysis chamber (110) to the central chamber (120);

wherein:

at least one oxygen injection port (132) is in a cracking chamber at the bottom of said central chamber (120); and the gaseous communication ports (128) are at the top and on the sides of said central chamber (120), wherein said device comprises at least one double wall (124) separating the central chamber (120) from the pyrolysis chamber (110), intended to circulate a gaseous flow of CO2, wherein on an opposite side to the central chamber (120) the pyrolysis chamber (110) is delimited by a further double wall (112) on at least one lateral portion of said pyrolysis chamber (110), and wherein the at least one double wall (124) separating the pyrolysis chamber (110) and the central chamber (120), and the further double wall (112) delimiting the pyrolysis chamber (110), communicate with each another through one or more transverse double walls (126), wherein said device is in the form of a one-piece assembly.

2. Device (100) according to claim 1, wherein said device comprises in the central chamber (120) a heat source providing the heat necessary for starting said device (100).

3. Device (100) according to claim 1, wherein the central chamber (120) and the pyrolysis chamber (110) are concentric.

4. Device (100) according to claim 1, wherein said device comprises at least one grill (114) for introducing a gaseous flow of CO2.

5. Device (100) according to claim 1, wherein said device comprises at least a hole (134) for introducing CO2 into at least one of said at least one, of said further, and of said transverse double wall (112, 124, 126).

6. Facility (400) for producing a synthesis gas comprising CO and H2, from carbonaceous dry raw materials (MPCS), wherein said facility (400) comprises:

a device (100) according to claim 1;

means (402) for introduction of MPCS in said conversion device (100); and means (406) for extraction of synthesis gas provided by said conversion device (100).

7. Facility (400) according to claim 6, wherein the extraction means (406) comprises at least one of the following means:

at least one means (414) for aspiration of synthesis gas connected to the extraction port (108) of the conversion device (100);

at least one heat exchanger (408, 412) for cooling the synthesis gas supplied from said conversion device (100); and at least one device (410) for filtration of synthesis gas provided by said conversion device (100).

* * * * *